United States Patent
Reckmann et al.

[11] Patent Number: 5,208,048
[45] Date of Patent: May 4, 1993

[54] EXTRUSION HEAD FOR TUBULAR STRANDS OF THERMOPLASTIFIED SYNTHETIC RESIN MATERIAL

[75] Inventors: Bernhard Reckmann, Troisdorf-Spich; Wilfried Schwarz, Königswinter; Bernd Schroeter, Troisdorf-Sieglar, all of Fed. Rep. of Germany

[73] Assignee: Reifenhauser GmbH & Co. Maschinenfabrik, Troisdorf, Fed. Rep. of Germany

[21] Appl. No.: 852,633

[22] Filed: Mar. 17, 1992

[30] Foreign Application Priority Data

Mar. 22, 1991 [DE] Fed. Rep. of Germany ....... 4109369

[51] Int. Cl.[5] .............................................. B29C 47/20
[52] U.S. Cl. .................................... 425/462; 425/467; 264/209.1; 264/209.8
[58] Field of Search ............... 425/131.1, 133.1, 133.5, 425/191, 461, 462, 467, 382.4, 464; 264/173, 209.1, 209.8

[56] References Cited

U.S. PATENT DOCUMENTS

| 2,688,154 | 3/1954 | Huckfeldt | 425/462 |
| 2,820,249 | 1/1958 | Colombo | 425/462 |
| 4,182,603 | 1/1980 | Knittel | 425/462 |
| 4,185,954 | 1/1980 | Murakami et al. | 425/133.1 |
| 4,421,465 | 12/1983 | Herrington | 425/462 |
| 4,961,892 | 10/1990 | Prevotat | 264/209.8 |

FOREIGN PATENT DOCUMENTS

| 2306834 | 9/1974 | Fed. Rep. of Germany . |
| 2509024 | 4/1985 | Fed. Rep. of Germany . |
| WO88/01226 | 2/1988 | World Int. Prop. O. . |

Primary Examiner—Jay H. Woo
Assistant Examiner—Khanh P. Nguyen
Attorney, Agent, or Firm—Herbert Dubno

[57] ABSTRACT

A flow-rearrangement device between the annular extrusion gap of an extrusion head and the feed for the thermoplastified synthetic resin has two disks with registering grooves forming rearrangement ducts communicating axial inlet bores with axial outlet bores to effect a flow rearrangement of the thermoplastified synthetic resin which produces microtexturing of the finished product. The extrusion head may be a film or foil blowing head.

14 Claims, 2 Drawing Sheets

EXTRUSION HEAD FOR TUBULAR STRANDS OF THERMOPLASTIFIED SYNTHETIC RESIN MATERIAL

FIELD OF THE INVENTION

Our present invention relates to an extrusion head for producing tubular strands of thermoplastified synthetic resin material, either for solidification in the extruded shape or for subsequent modification, e.g. blowing, in, for example, a film or foil blowing apparatus. More particularly, the invention relates to an extrusion die which can include a core-forming inner die member and an outer die member spacedly surrounding the core forming member so that between the two members an annular extrusion gap or passage is formed, at the outlet side of which the tubular strand emerges from a nozzle or mouth while, at the upstream end of the passage, a feed device is provided for supplying the thermoplastified synthetic resin material.

BACKGROUND OF THE INVENTION

Extrusion dies or extrusion heads of the aforedescribed construction are provided in extruder apparatus for producing tubes, pipes and other hollow articles, or as the heads from which an expandable tubular strand of the plastically deformable material can emerge, e.g. for film or foil blowing. The feed means can include a distribution device, for example distribution passages, an annular manifold or the like. The source of the thermoplastified synthetic resin is usually a worm or screw extruder or the like.

In conventional extrusion heads of the type with which the invention is concerned, for example those described in DE-OS 23 06 834 and DE-PS 25 09 024, the feed unit includes distribution passages by means of which the thermoplastified synthetic resin, optionally through a widening annular distribution chamber, enters the annular extrusion gap. This construction results in a microtexturing in the finished product which has been found to be detrimental to the quality thereof.

To suppress this microtexturing, it has been found to be advantageous to incorporate in the distribution passages of the die or head, mixing elements or baffles which direct the inner flow streams outwardly and the outer flow streams inwardly. Such arrangements are costly and require significant maintenance and are not always satisfactory as to the results obtained.

OBJECTS OF THE INVENTION

It is, therefore, the principal object of the present invention to provide an extrusion head for the purposes described which includes a simple, low maintenance arrangement for suppressing detrimental microtextures in the finished product to the point that the microtexturing is practically completely eliminated.

Another object of our invention is to provide an extrusion head for producing a tubular strand of thermoplastified synthetic resin whereby drawbacks of earlier systems are avoided.

Still another object of the invention is to provide an extrusion head for producing a tubular strand of the thermoplastified synthetic resin which is of comparatively low cost and can be maintained particularly simply and easily, and which is capable of producing a finished product which is practically free from microtexturing.

SUMMARY OF THE INVENTION

These objects and others which will become apparent hereinafter are attained, in accordance with the present invention, by providing between the feed means and the annular extrusion gap, a flow-rearrangement device which has a multiplicity of inlet bores distributed around its periphery and a multiplicity of outlet bores offset from the inlet bores and likewise distributed around the periphery of the device the inlet and outlet bores being interconnected by rearrangement ducts which extend generally transversely and preferably perpendicularly to these bores.

More particularly, an extrusion head according to the invention can comprise:

a core-forming inner die member;

an outer die member defining with the inner die member an annular extrusion passage surrounding an axis and traversed by the thermoplastified synthetic resin, the passage having an upstream end and a mouth at a downstream end from which the tubular strand emerges;

feed means communicating with the upstream end of the passage for feeding a flow of the thermoplastified synthetic resin to the passage; and flow-rearrangement means between the feed means and the upstream end of the passage for redistributing the flow of the thermoplastified synthetic resin fed to the upstream end of the passage, the flow-rearrangement means including:

- a multiplicity of inlet bores angularly spaced apart around the axis and connected to the feed means,
- a multiplicity of outlet bores angularly spaced apart around the axis, connected to the upstream end of the passage and angularly offset from the inlet bores about the axis, and
- rearrangement ducts generally transverse to the bores interconnecting the inlet bores with the outlet bores for delivering the thermoplastified synthetic resin from the inlet bores to the outlet bores.

Preferably the inlet and outlet bores extend substantially axially, i.e. parallel to one another and parallel to the axis of the head which the arrays of bores surround, the inlet and outlet bores being respectively equidistant from one another and thus annularly equispaced about this axis. In axial projection, therefore, each inlet bore lies between two outlet bores and vice versa.

We have found, quite surprisingly, that with the described arrangement of the inlet and outlet bores and the connection between these bores by rearrangement ducts, an extremely effective rearrangement and delamination of the flowing thermoplastified synthetic resin is effected such that inner flows entering the inlet bores are directed to outer flows and outer flows are directed to inner flows as the thermoplastified synthetic resin traverses the rearrangement ducts and the outlet bores.

The spacings of the inlet and outlet bores from one another, the number of bores, the flow cross sections thereof and the flow cross sections of the rearrangement ducts can be varied for the particular needs and for different flowable plastics, thermoplastified synthetic resins. In practice we have found that detrimental microtextures in the finished product can be practically completely eliminated. The location of the flow rearrangement device in the path between the feed means and the annular extrusion gap can be by and large selected at will.

For high homogeneity of the finished product, it has been found to be advantageous to provide the rearrangement ducts with flow cross section which are less than, preferably half the flow cross section of the inlet and outlet bores and to provide such ducts that each inlet bore supplies two ducts extending in opposite directions and each outlet bore is fed from two ducts originating at two different inlet bores. The homogenization of the product can be still further improved if each rearrangement duct has one wall extending tangentially from the respective inlet duct, an opposite wall extending tangentially into a respective outlet duct.

Advantageously, the rearrangement ducts have rounded cross sections.

For ease of fabrication and maintenance, the flow-rearrangement device can be formed in two annular disks which are juxtaposed with on another and preferably superposed so that the inlet and outlet bores are formed in respective disks and the rearrangement ducts are formed by registering grooves formed in the opposite faces of these disks with each groove forming half of a respective duct.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
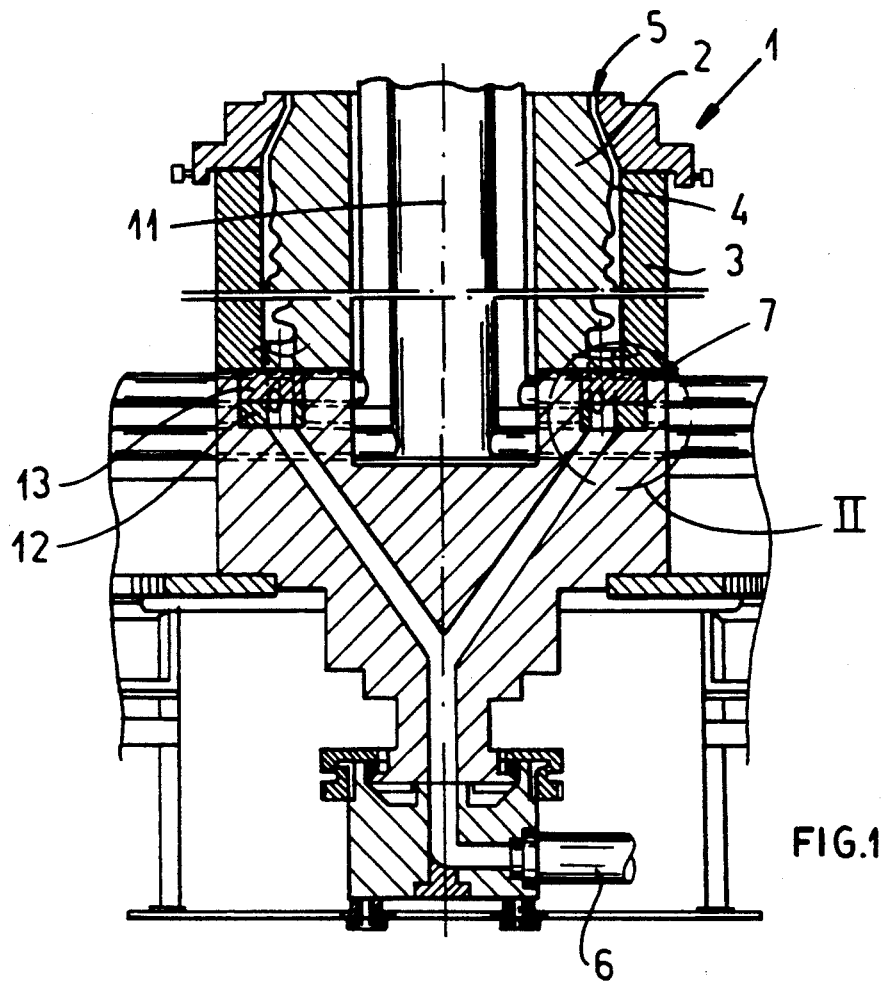
FIG. 1 is an axial cross sectional view of an extrusion head of the invention in the form of a film or foil blowing head.

The extrusion head shown in FIG. 1 serves to produce a tubular strand of a thermoplastified synthetic resin which can be solidified into a tube or pipe or other hollow structure of a shape imparted by the extrusion head, or which can be blown, extruded into a balloon or bubble and thereby stretched, in the production of films or foils. In the embodiment shown in FIG. 1 the extrusion head forms a so-called blowing head for the production of such plastic foils.

The blowing head 1 comprises a core-forming inner die member 2 which is surrounded by an outer die member 3. Between the inner die member 2 and the outer die member 3, an annular extrusion gap 4 is formed, this gap being traversed by the thermoplastified synthetic resin which emerges at a nozzle opening, orifice or mouth 5.

With its inlet for upstream ends, the passage communicates with a feed means or device 6 for the thermoplastified synthetic resin which can derive from a worm or screw extruder (not shown), and which can include branching flow passages.

Figure 2:
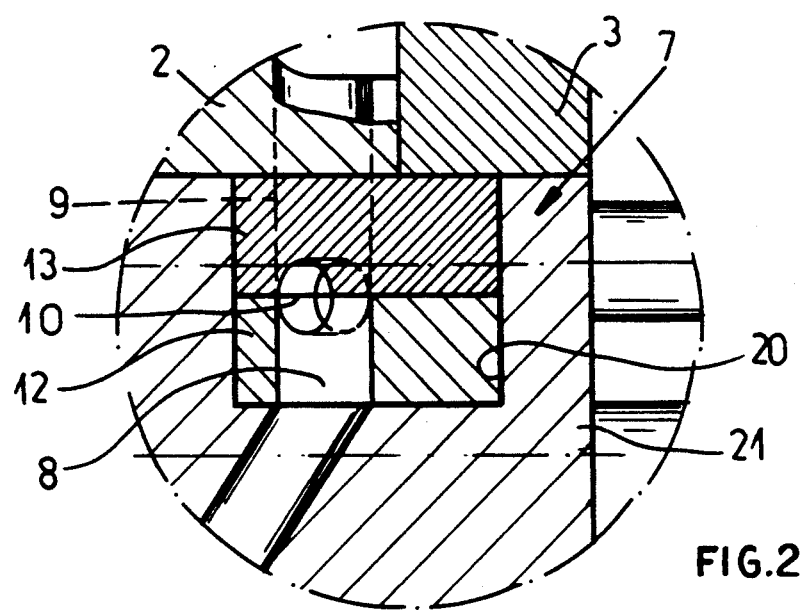
FIG. 2 is a detail section of the region II of FIG. 1.
Figure 3:
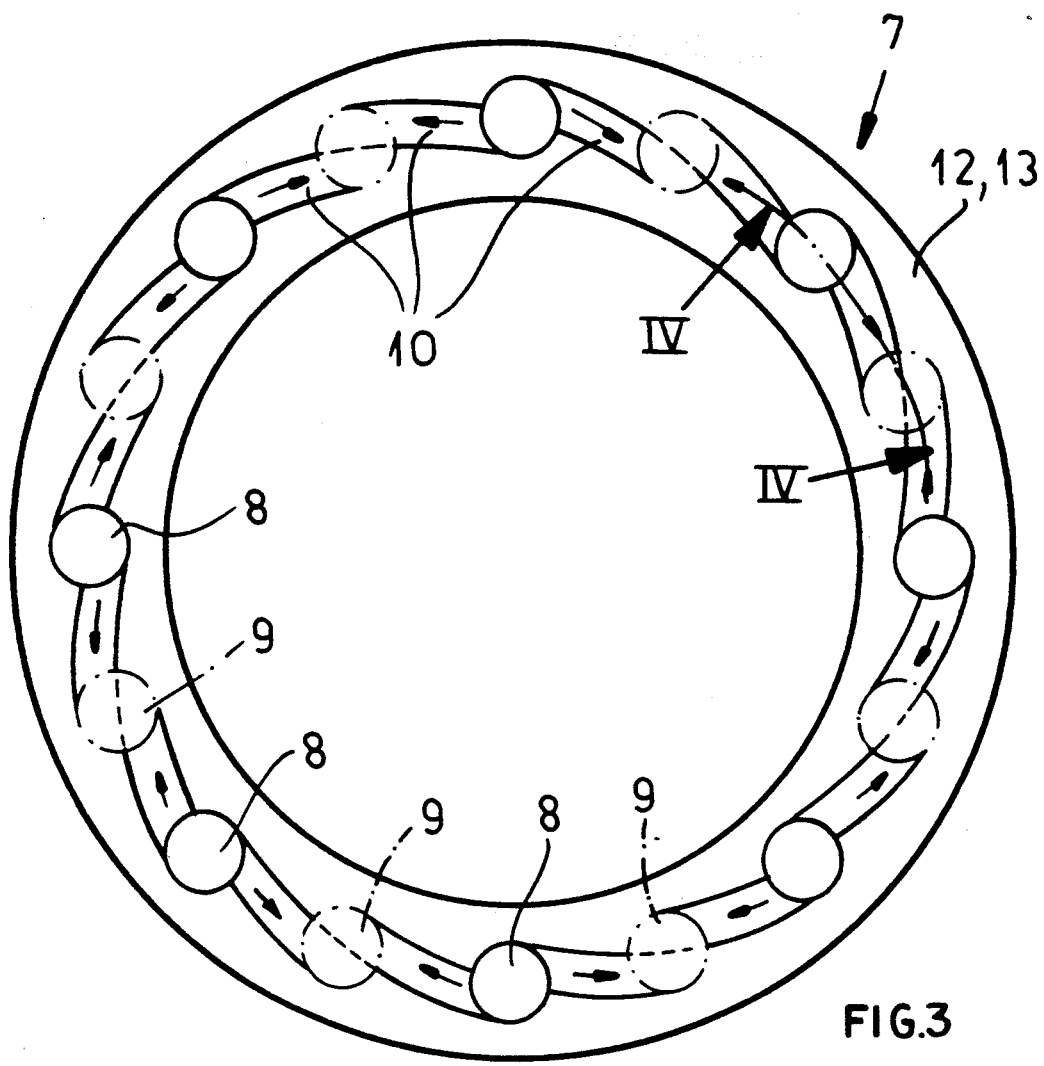
FIG. 3 is an end view corresponding to an axial projection, of one of the annular disks forming the flow arrangement device of the invention, greatly enlarged in scale with respect to FIGS. 1 and 2.
Figure 4:
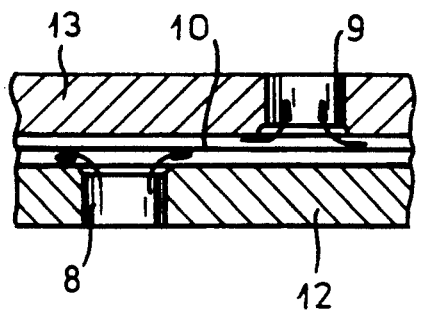
FIG. 4 is a section generally along the line IV—IV of FIG. 3.

As can be seen from FIGS. 2-4, between the feed means 6 and the annular extrusion gap 4, a flow-rearrangement device 7 is provided.

This device comprises axially extending inlet bores 8 which are disposed in a circular array about an axis of the head, and a circular array of outlet bores 9 which are angularly offset from the bores 8. This will be apparent especially from FIGS. 3 and 4.

In the embodiment shown, the inlet bores 8 on the one hand and the outlet bores 9 on the other are disposed along circles which are coaxial and coincide. While they have the same diameter in the embodiment illustrated, they may have different diameters.

In FIG. 3 the dot-dash lines represent the projections of the holes 9 on the ring formed with the holes 8 while the broken lines represent overlap in the grooves forming the ducts.

The inlet and outlet bores 8 and 9 extend parallel to the axis 11 as has been noted previously. Furthermore, the inlet bores 8 and the outlet bores 9, respectively, are equidistant from one another in their respective arrays and thus angularly equispaced from one another. The arrays are so oriented, however, that in the axial direction, each outlet bore 9 is located between two inlet bores an vice versa.

The rearrangement ducts 10 extend substantially circumferentially as can be seen from FIG. 3 but they can also be arcuate in other patterns and even S shaped so that they do not form dead spots with respect to flow.

As can be seen from FIG. 4, each rearrangement duct 10 can have a flow cross section which is less than that of the bores with which the duct communicates and which is preferably about half the cross section of the respective bore 8 or bore 9. This ensures a very uniform flow rearrangement, especially if, as shown, the flow from each inlet bore 8 passes into two ducts 10 in opposite directions as represented by the arrow in FIG. 3 and each bore 9 is supplied from two different directions by a duct 10.

As can be seen from FIG. 3, each duct 10 can have one duct wall extending tangentially away from a respective inlet bore 8 and its opposite duct wall opening tangentially into the respective outlet bore 9. The rearrangement ducts 10 have a rounded cross section and are each formed by registering grooves in two annular disks 12 and 13, one of which is formed with the bores 8 while the other is formed with the bores 9. The disks can be received in a channel 20 formed in a plate 21 of the head against which the members 2 and 3 thereof are clamped.

We claim:

1. An extrusion head for extruding a tubular strand of thermoplastified synthetic resin material, comprising:
   a core-forming inner die member;
   an outer die member defining with said inner die member an annular extrusion passage surrounding an axis and through which said thermoplastified synthetic resin flows, said passage having an upstream end and a mouth at a downstream end form which said tubular strand emerges;
   feed means communicating with said upstream ed of said passage for feeding a flow of said thermoplastified synthetic resin to said passage; and
   flow-rearrangement means between said fed means and said upstream end of said passage for redistributing the flow of said thermoplastified synthetic resin fed to said upstream end of said passage, said flow-rearrangement means including:
   a multiplicity of inlet bores angularly spaced apart around said axis and connected to said feed means,
   a multiplicity of outlet bores angularly spaced apart around said axis, connected to said upstream end of said passage and angularly offset form the inlet bores about sad axis, and rearrangement ducts generally transverse to said bores interconnecting said inlet ores with said outlet bores for delivering said thermoplastified synthetic resin from said inlet bores to said outlet bores, said bores all extending generally in axial directions.

2. The extrusion head defined in claim 1 wherein said inlet bores are angularly equispaced about said axis and said outlet bores ar angularly equispaced about said axis.

3. The extrusion head defined in claim 2 wherein said outlet bores in axial projection are located substantially midway between axial projections of said inlet bores.

4. The extrusion head defined in claim 3 wherein said rearrangement ducts have flow cross sections which are smaller than the flow cross sections of respective inlet and outlet bores, each inlet bore delivers said thermoplastified synthetic resin to two rearrangement ducts and each outlet bore received said thermoplastified synthetic resin from two of said rearrangement ducts.

5. The extrusion head defined in claim 4 wherein each rearrangement duct has a wall extending tangentially from a respective inlet bore and another wall extending tangentially to a respective outlet bore.

6. The extrusion head defined in claim 5 wherein each of said rearrangement ducts has a rounded cross section.

7. The extrusion head defined in claim 6 wherein said flow-rearrangement means is formed in two superposed annular disks, one of said disks being provided with said inlet bores, the other of said disks being provided with said outlet bores, and each of said disks being formed with a groove registering with a groove of the other disk to form a respective rearrangement duct therewith.

8. The extrusion head defined in claim 1 wherein said inlet bores are angularly equispaced about said axis and said outlet bores are angularly equispaced about said axis.

9. The extrusion head defined in claim 1 wherein said outlet bores in axial projection are located substantially midway between axial projections of said inlet bores.

10. The extrusion head defined in claim 1 wherein said rearrangement ducts have flow cross sections which are smaller than the flow cross sections of respective inlet and outlet bores, each inlet bore delivers said thermoplastified synthetic resin to two rearrangement ducts and each outlet bore received said thermoplastified synthetic resin from two of said rearrangement ducts.

11. The extrusion head defined in claim 10 wherein each rearrangement duct has a flow cross section which is substantially half of the flow cross section of a respective inlet bore and substantially half of the flow cross section of a respective outlet bore.

12. The extrusion head defined in claim 1 wherein each rearrangement duct has a wall extending tangentially from a respective inlet bore and another wall extending tangentially to a respective outlet bore.

13. The extrusion head defined in claim 1 wherein each of said rearrangement ducts has a rounded cross section.

14. An extrusion head for extruding a tubular strand of thermoplastified synthetic resin material, comprising:

a core-forming inner die member;

an outer die member defining with said inner die member an annular extrusion passage surrounding an axis and through which said thermoplastified synthetic resin flows, said passage having an upstream end and a mouth at a downstream end form which said tubular strand emerges;

feed means communicating with said upstream end of said passage for feeding a flow of said thermoplastified synthetic resin to said passage; and flow-rearrangement means between said feed means and said upstream end of said passage for redistributing the flow of said thermoplastified synthetic resin fed to said upstream end of said passage, said flow-rearrangement means including:

a multiplicity of inlet bores angularly spaced apart around said axis and connected to said feed means, a multiplicity of outlet bores angularly spaced apart around said axis, connected to said upstream end of said passage and angularly offset from the inlet bores about said axis, and rearrangement ducts generally transverse to said bores interconnecting said inlet bores with said outlet bores for delivering said thermoplastified synthetic resin from said inlet bores to said outlet bores, said flow rearrangement means being formed in two superposed annular disks, one of said disks being provided with said inlet bores, the other of said disks being provided with said outlet bores, and each of said disks being formed with a groove registering with a groove of the other disk to form a respective rearrangement duct therewith.

* * * * *